United States Patent
Hesterberg et al.

(10) Patent No.: US 8,858,719 B2
(45) Date of Patent: Oct. 14, 2014

(54) METHOD FOR THE OPERATION OF A WATER-CONDUCTING HOUSEHOLD APPLIANCE

(75) Inventors: Bernd Hesterberg, Heidenheim (DE); Karlheinz Rehm, Dischingen Ortst. Trugenhofen (DE); Franz-Josef Wagner, Nördlingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 446 days.

(21) Appl. No.: 12/674,449

(22) PCT Filed: Aug. 25, 2008

(86) PCT No.: PCT/EP2008/061085
§ 371 (c)(1),
(2), (4) Date: Feb. 22, 2010

(87) PCT Pub. No.: WO2009/027371
PCT Pub. Date: Mar. 5, 2009

(65) Prior Publication Data
US 2011/0048459 A1 Mar. 3, 2011

(30) Foreign Application Priority Data
Aug. 31, 2007 (DE) .......................... 10 2007 041 311

(51) Int. Cl.
*B08B 7/04* (2006.01)
*A47L 15/46* (2006.01)
*A47L 15/42* (2006.01)
*A47L 15/00* (2006.01)

(52) U.S. Cl.
CPC ......... *A47L 15/4291* (2013.01); *A47L 15/4217* (2013.01); *A47L 2401/08* (2013.01); *A47L 2501/01* (2013.01); *Y02B 40/46* (2013.01); *A47L 15/0023* (2013.01)

USPC .......... 134/18; 134/25.2; 134/56 D; 134/57 D

(58) Field of Classification Search
CPC ............ A47L 15/0023; A47L 15/4244; A47L 15/4217; A47L 2401/08; A47L 2501/01
USPC ................................ 134/18, 56 D, 57 D, 25.2
See application file for complete search history.

(56) References Cited

U.S. PATENT DOCUMENTS 4,097,307 A    6/1978   Geiger
5,470,142 A   11/1995   Sargeant et al.
(Continued)

FOREIGN PATENT DOCUMENTS

CN        1567109 A   *  1/2005
DE    19630357 A1    *  2/1998
(Continued)

OTHER PUBLICATIONS

Machine translation of JP 11-128146 to Kouizumi et al.*
(Continued)

Primary Examiner — Michael Kornakov
Assistant Examiner — Douglas Lee
(74) Attorney, Agent, or Firm — James E. Howard; Andre Pallapies

(57) ABSTRACT

A method for operating a water-conducting household appliance having a storage container which is connected by means of an overflow outlet in a liquid-conducting manner to a washing compartment and having a pump which is connected in the liquid-conducting manner to the washing compartment. The method includes starting the pump; filling the storage container with a liquid; monitoring a first operating parameter associated with the pump after the pump has been started; and terminating the filling of the storage container with the liquid when the first operating parameter reaches a predefined threshold value and/or the first operating parameter exceeds a predefined fluctuation range.

20 Claims, 4 Drawing Sheets

(56) References Cited

U.S. PATENT DOCUMENTS

| | | |
|---|---|---|
| 2003/0010113 A1 | 1/2003 | Rosenbauer et al. |
| 2006/0219262 A1 | 10/2006 | Peterson et al. |
| 2006/0245931 A1* | 11/2006 | Zeh .............................. 417/44.1 |
| 2007/0163626 A1 | 7/2007 | Klein |

FOREIGN PATENT DOCUMENTS

| | | | |
|---|---|---|---|
| EP | 0326893 A2 | | 8/1989 |
| EP | 0461722 A1 | | 12/1991 |
| GB | 2271417 A | | 4/1994 |
| GB | 2311932 A | * | 10/1997 |
| JP | 11128146 A | * | 5/1999 |
| JP | 2002253464 A | * | 9/2002 |

OTHER PUBLICATIONS

Machine translation of CN 1567109 to Shin.*
Machine translation of DE 19630357A1 to Schrott.*
Machine translation of JP2002-253464 to Hara.*
Foreign Patent Office Report—CN.
Report of Examination CN 200880108927 dated Jan. 14, 2013.

* cited by examiner

METHOD FOR THE OPERATION OF A WATER-CONDUCTING HOUSEHOLD APPLIANCE

BACKGROUND OF THE INVENTION

The invention relates to a method for operating a water-conducting household appliance, in particular a dishwasher or washing machine.

DE 38 03 006 A1 discloses a dishwasher having a washing compartment, a water inlet valve for filling the washing compartment with liquid, a spraying device disposed in the washing compartment, a circulation pump for delivering the liquid to the spraying device, and an electric motor for driving the circulation pump. In order to ensure that there is currently a sufficient amount of liquid in the washing compartment to enable the circulation pump to deliver the liquid without entrapped air to the spraying device, DE 38 03 006 A1 discloses that after completion of a filling operation to fill the washing compartment to a minimum level with the liquid the water inlet valve for filling the washing compartment will be closed when a constant measurement value for the current consumption of the electric motor for the circulation pump has been reached.

DE 42 33 643 C2 discloses a dishwasher having a washing compartment and a storage container connected in a heat-conducting manner to the washing compartment for the purpose of provisioning liquid that is to be used in a subsequent subprogram of an overall program of the dishwasher. Owing to the heat-conducting connection between the washing compartment and the storage container the liquid contained in the storage container is preheated for the subprogram.

BRIEF SUMMARY OF THE INVENTION

The object of the present invention is therefore to disclose a simplified method for detecting a full storage container of a water-conducting household appliance.

The object of the invention is achieved by means of a method for operating a water-conducting household appliance, comprising the following method steps of:
 filling the storage container with liquid,
 starting the circulation pump,
 monitoring at least one operating parameter associated with the circulation pump, and
 terminating the filling of the storage container with liquid when the operating parameter reaches a predefined threshold value and/or when the operating parameter exceeds a predefined fluctuation range.

The object of the invention is also achieved by means of a water-conducting household appliance.

The water-conducting household appliance according to the invention has a storage container which is connected to the washing compartment, in particular in a heat-conducting manner, in that it is secured e.g. to a wall of the washing compartment. During the operation of the dishwasher the storage container is filled with liquid, e.g. with water from a water supply line until it is full. Toward that end the control device, which has, for example, a suitably programmed microprocessor, opens the valve. Once the storage container is completely filled with liquid, the excess liquid flows e.g. via an overflow outlet from the storage container into the washing compartment. The storage container can also be connected in a heat-conducting manner to an external wall of the water-conducting household appliance.

In the washing compartment there can be disposed a spraying device, e.g. in the form of spray arms, to which, in the case of a dishwasher, a pump serving as a circulation pump delivers liquid contained in the washing compartment during the dishwasher's operation. The circulation pump is driven e.g. by means of a drive. The latter has e.g. an electric motor which, for example, is controlled by suitable electronics or power electronics. The electric motor can be, for example, a three-phase motor, in particular a brushless synchronous motor.

According to the inventive method the pump is started in particular as a result of the control device starting the drive. During the filling of the storage container only relatively little liquid, if any, is contained in the washing compartment. According to a variant of the inventive method this is ensured in that before the storage container begins to be filled with liquid and/or before the circulation pump or, as the case may be, the electric drive is started, liquid contained in the washing compartment is pumped out. This can be accomplished e.g. by starting a drain pump provided for the purpose of pumping out the liquid contained in the washing compartment, said pump being switched on in particular by the control device.

As just mentioned, before the storage container is filled there is only relatively little liquid, if any, in the washing compartment. Consequently the circulation pump initially runs in air and has a relatively small and a relatively constant power draw or, as the case may be, generates a relatively small and relatively constant torque. If the storage container is full and nonetheless continues to be supplied with liquid, the excess liquid flows into the washing compartment via an overflow outlet for example. Said liquid reaches the pump in the intended manner, as a result of which there is a change in the operating performance of the pump or, as the case may be, of the electric drive driving the pump. If the storage container continues to be filled with liquid, more and more liquid flows into the washing compartment until the pump is pumping liquid essentially continuously, as a result of which the pump has a higher, though likewise relatively constant power draw or, as the case may be, generates a higher, though relatively constant torque. During the time interval in which, although liquid is flowing into the washing compartment, there is not yet a sufficient volume thereof, with the result that the pump is pumping liquid essentially continuously, the power draw or, as the case may be, the torque increases on the one hand. However, these operating parameters also fluctuate to a relatively great degree because the pump is pumping both liquid and air.

Accordingly it is provided according to the invention to monitor the at least one operating parameter associated with the pump and to terminate the filling of the storage container when the operating parameter reaches the predefined threshold value and/or when the operating parameter exceeds the predefined fluctuation range. If this is the case it can be assumed that the storage container is completely filled with liquid, as a result of which the control device of the water-conducting household appliance according to the invention terminates the filling operation.

The pump, in particular the circulation pump, is driven by the electric drive, for example. According to an embodiment variant of the inventive method or, as the case may be, of the inventive water-conducting household appliance, such as e.g. a dishwasher, the operating parameter associated with the circulation pump is an operating parameter of the electric drive driving the circulation pump. The operating parameter of the electric drive is e.g. its electric power output, an electric current of the electric drive, an electrical voltage of the electric drive, a torque that is to be generated by the electric drive and/or a rotational speed of the electric drive. These operating parameters can be determined relatively easily during the operation of the dishwasher, in particular when the drive is an electronically controlled drive, which means that the method according to the invention can be implemented relatively easily. It can also be provided to regulate or control the electric drive. In such a case an operating parameter of the electric drive or of the circulation pump is required for said control or regulation, which operating parameter can then also be used for detecting when the storage container is completely filled with liquid. In such a case the electric current or the electric power output of the electric drive or motor of the electric drive in particular lends itself to use as the operating parameter requiring to be monitored.

In the case of a variant of the inventive method or, as the case may be, of the water-conducting household appliance, e.g. of a dishwasher according to the invention, in which the operating parameter is the electric current of the electric drive, the threshold value can be associated in particular with an electric current intensity which is greater than the intensity of the electric current of the electric drive when the circulation pump is essentially running only in air, and less than the intensity of the electric current of the electric drive when the circulation pump is pumping liquid essentially continuously. In the case of the variant of the inventive method or, as the case may be, the inventive dishwasher in which the operating parameter is the electric power output of the electric drive, the threshold value can be associated with an electric power output which is greater than the electric power output of the electric drive when the circulation pump is essentially running only in air, and less than the electric power output of the electric drive when the circulation pump is pumping liquid essentially continuously. According to these embodiment variants it can thus be ensured that on the one hand the storage container is completely full before the valve is closed. On the other hand, according to these embodiment variants, a relatively strong overflowing of the storage container can be prevented.

By means of the inventive method or, as the case may be, the inventive dishwasher it is accordingly possible to detect a full storage container in particular without a special switch which detects when the storage container is completely filled with liquid.

BRIEF DESCRIPTION OF THE DRAWINGS

An exemplary embodiment is illustrated by way of example in the attached schematic drawings, in which.

DETAILED DESCRIPTION OF EXEMPLARY EMBODIMENTS OF THE PRESENT INVENTION

Figure 1:
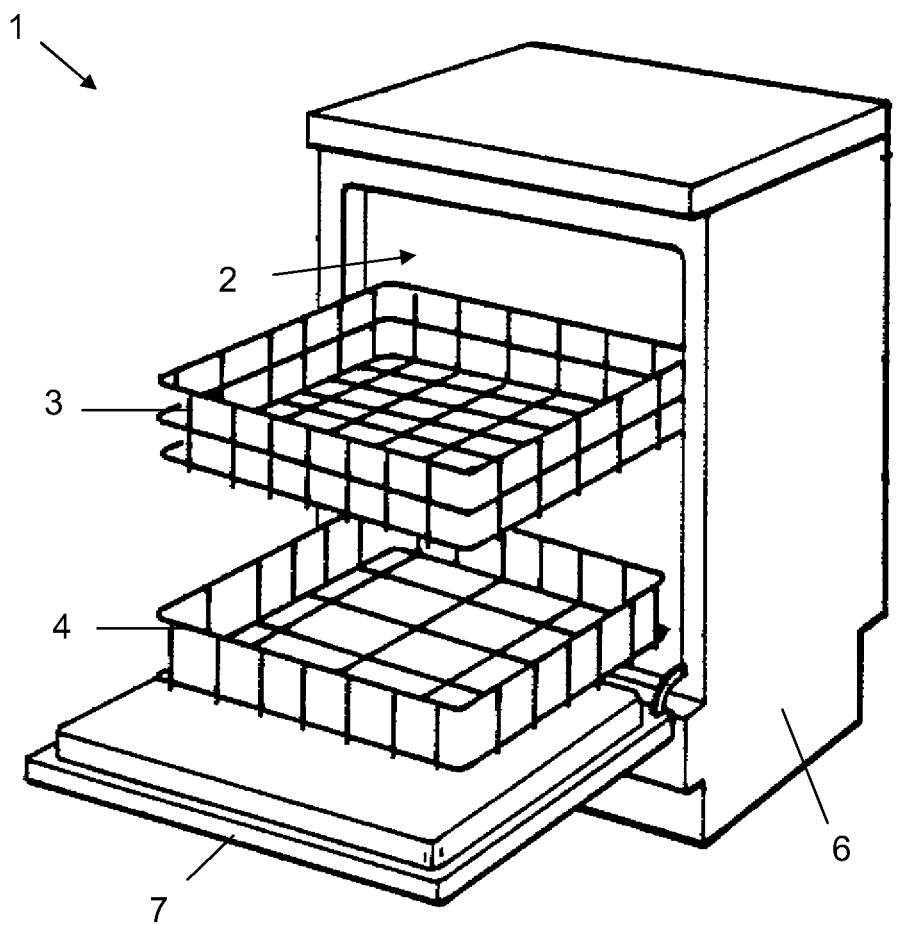
FIG. 1 shows a dishwasher.
Figure 2:
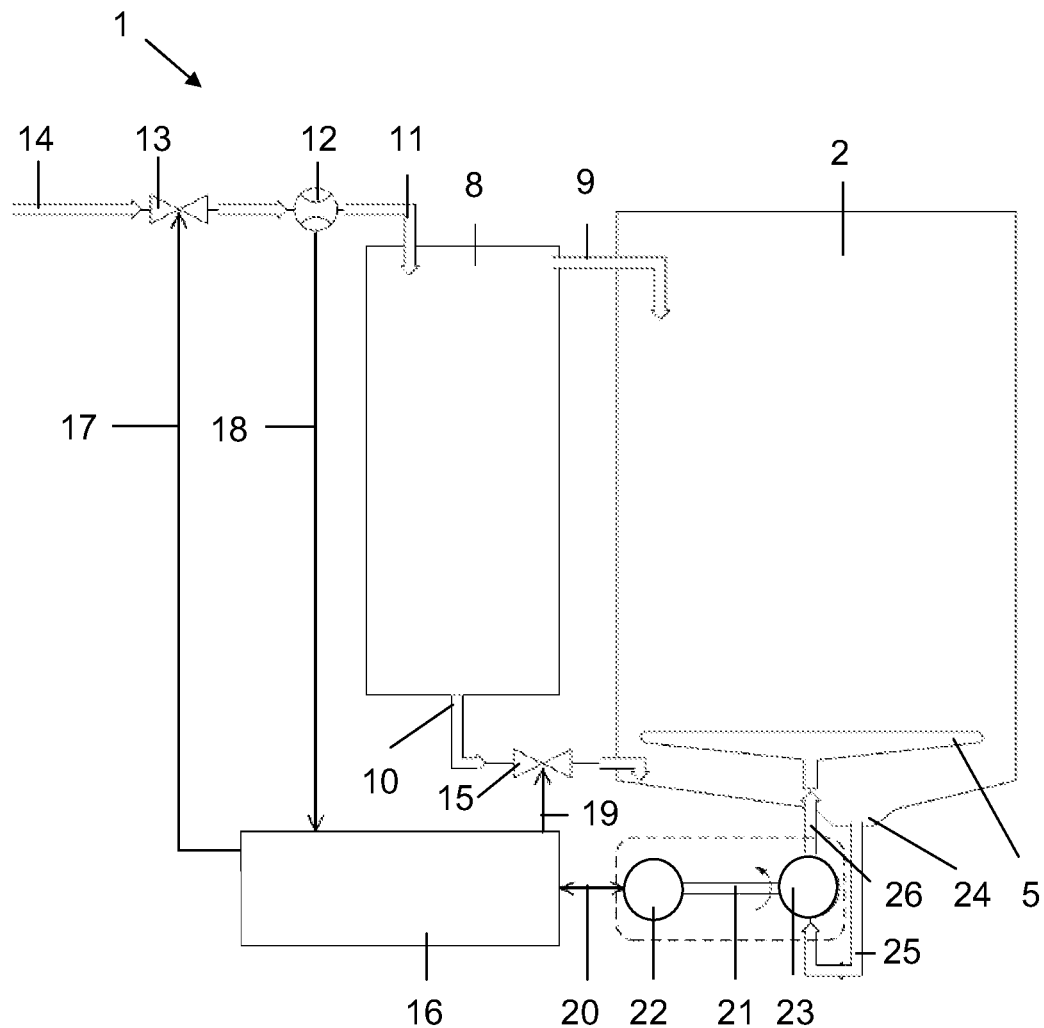
FIG. 2 shows a schematic diagram of the dishwasher having a circulation pump and a storage container.

FIG. 1 shows a dishwasher 1 and FIG. 2 shows a schematic diagram of the dishwasher 1. The dishwasher 1 has a washing compartment 2 for accommodating items to be washed, e.g. dirty dishes and cutlery, which are arranged, for example, in an upper dishwasher basket 3 and a lower dishwasher basket 4. Disposed in the washing compartment 2, which is manufactured, for example, from metal, e.g. from chrome, steel or chromium-nickel steel, are spraying devices, e.g. generally known spray arms 5 for spraying the items to be washed with a liquid which is usually referred to as washing liquid. Located in the base of the washing compartment 2 is a sump 24 in which a circulation pump 23 is disposed. Liquid from the washing compartment 2 reaches the circulation pump 23 via the sump 24, as indicated by means of an arrow 25 in FIG. 2. The circulation pump 23 in turn pumps the liquid to the spray arms 5, as indicated by means of an arrow 26 in FIG. 2.

The washing compartment 2 is disposed in a housing 6 of the dishwasher 1 and comprises two sidewalls. The sides of the sidewalls of the washing compartment 2 pointing into the interior of the washing compartment 2 are visible when the door 7 of the dishwasher 1 is open. When the door 7 is open the upper dishwasher basket 3 and the lower dishwasher basket 4 can be withdrawn from the washing compartment 2.

In the case of the present exemplary embodiment there is disposed between one of the sidewalls of the washing compartment 2 and the corresponding sidewall of the housing 6 a storage container 8 for liquid, in particular for fresh water, which storage container acts as a heat exchanger. The storage container 8 is connected to the relevant sidewall of the washing compartment 2 in a heat-conducting manner such that the liquid contained in the storage container 8 is heated by the heated liquid in the washing compartment 2. The storage container 8 is, for example, in direct contact through one of its sidewalls with the relevant sidewall of the washing compartment 2 and is e.g. screwed or clipped to said sidewall.

The storage container 8 has a liquid inlet 11 and an outlet 10 for discharging the liquid of the storage container 8 into the washing compartment 2. A flowmeter 12 is connected upstream of the liquid inlet 11 and upstream of the flowmeter 12 there is connected in turn a filling valve 13 by means of which, in the case of the present exemplary embodiment, the storage container 8 can be filled with fresh water from a water supply line 14. Connected downstream of the outlet 10 is an outlet valve 15 by means of which the liquid from the storage container 8 can be discharged in a controlled manner into the washing compartment 2. The storage container 8 also has an overflow outlet 9 via which excess liquid from the storage container 8 can flow into the washing compartment 2.

The dishwasher 1 additionally has a control device 16 which has e.g. a suitably programmed microprocessor. The control device 16 is supplied with electrical energy in a manner that is not shown and is connected by means of an electric cable 17 to the filling valve 13 and by means of an electric cable 19 to the outlet valve 15, such that the control device 16, with the aid of a computer program running on same, can open and close the filling valve 13 and the outlet valve 15 in order to control the filling of the storage container 8 with liquid from the water supply line 14 and a flowing of the liquid out of the storage container 8 into the washing compartment 2.

The volume of liquid flowing into the storage container 8 can be measured by means of the flowmeter 12 which is connected to the control device 16 via an electric cable 18.

The dishwasher 1 additionally has an electric drive 22, the electric motor of which drives the circulation pump 23 via a shaft 21. In the case of the present exemplary embodiment the motor of the electric drive 22 is what is referred to as a BLDC motor, i.e. a brushless DC three-phase synchronous motor. The electric drive 22 also has an inverter which supplies the electric motor of the electric drive 22 with electrical energy. The inverter generates the three-phase electrical voltage required for the motor, i.e. the required frequency and the required root-mean-square value of the electrical voltage. Suitable inverters have e.g. power semiconductors and are generally known to the person skilled in the art, for which reason the inverter is not shown explicitly and also will not be explained in further detail.

The electric drive 22 is connected to the control device 16 by means of an electric cable 20 such that the control device 16 can control and if necessary also regulate the inverter or, as the case may be, the electric drive 22 in a generally known manner.

Figure 3:
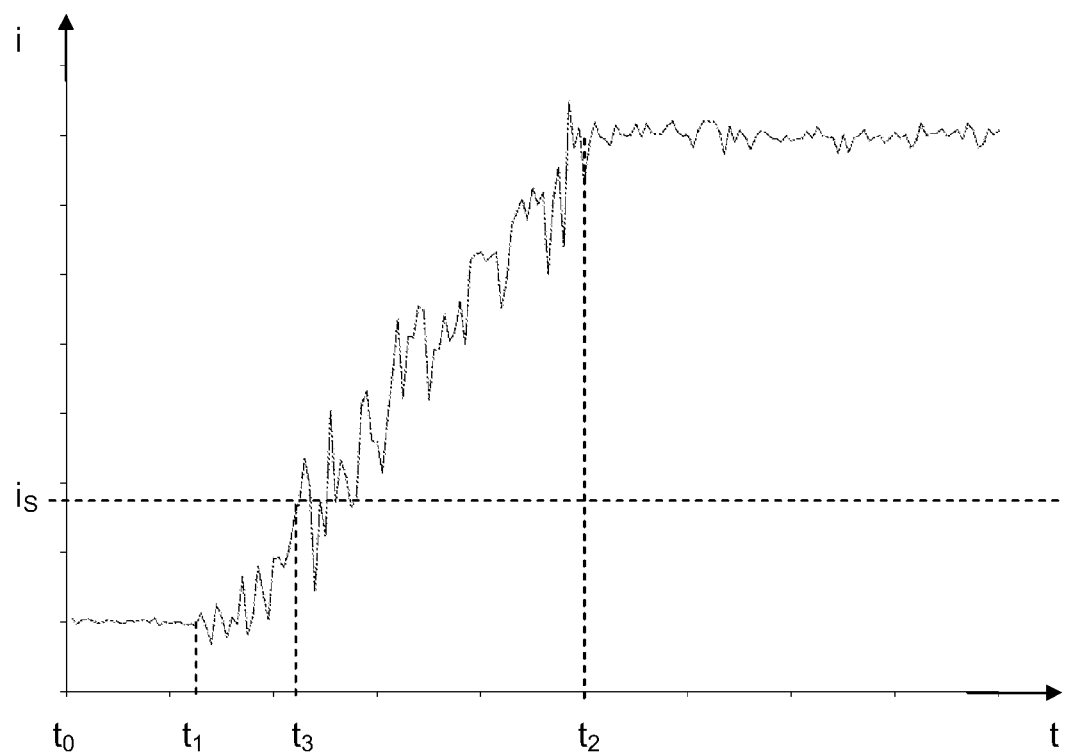
FIG. 3 shows a signal waveform associated with the circulation pump.

The control device 16 also receives information about at least one operating parameter of the electric drive 22 by way of the electric cable 20. The operating parameter of the electric drive 22 can be used e.g. for controlling or, as the case may be, regulating the electric drive 22. In the case of the present exemplary embodiment the operating parameter is the electric power output of the electric drive 22 or the electric current i of the motor of the electric drive 22. FIG. 3 shows a waveform of the electric current i by way of example.

Figure 4:
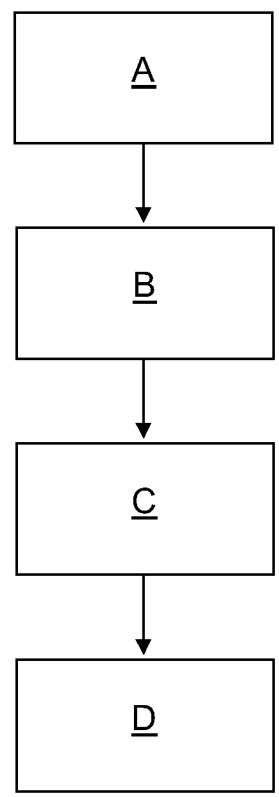
FIG. 4 is a flowchart for illustrating a method for filling the storage container.

In the case of the present exemplary embodiment the electric current i of the electric motor is used in order to detect a full storage container 8. A flowchart shown in FIG. 4 summarizes the method used in the case of the present exemplary embodiment for filling the storage container 8 with liquid.

Shortly before the storage container 8 is filled with liquid from the water supply line 14 there is no liquid in the washing compartment 2 and the circulation pump 23 is started as a result of the electric drive 22 of the circulation pump 23 being started at time $t_0$ (FIG. 3)—step A of the flowchart. The liquid has been pumped out of the washing compartment 2 e.g. by means of a drain pump that is not shown but is generally known. Since there is no or, if any, only a relatively small amount of liquid in the washing compartment 2, i.e. the sump 24 is also empty, the circulation pump 23 is running in air. The power draw of the electric drive 22, and hence also the electric current i of the electric motor, is accordingly relatively low and also relatively constant.

Simultaneously with the starting of the circulation pump 23, for example, the control device 16 or, as the case may be, a computer program running on the control device 16 opens the filling valve 13, as a result of which liquid from the water supply line 14 flows via the liquid inlet 11 into the storage container 8—step B of the flowchart. The outlet valve 15 is closed. While the storage container 8 is not yet completely filled with liquid from the water supply line 14, there is still no liquid in the washing compartment 2. Accordingly the circulation pump 23 is still running in air and has a relatively low and relatively constant power draw (no-load power).

At time $t_1$ the storage container 8 is completely full and excess liquid from the storage container 8 begins to run via the overflow outlet 9 of the storage container 8 into the washing compartment 2. Said liquid reaches the sump 24 and from there flows into the circulation pump 23. The circulation pump 23 begins pumping the liquid, as a result of which the power draw of the electric drive 22 and consequently the electric current i of the electric motor start to increase.

If the filling valve 13 is not closed, more and more liquid flows into the storage container 8 and hence via the overflow outlet 9 into the washing compartment 2. As a result the circulation pump 23 pumps more and more liquid and the electric power output of the electric drive 22 or, as the case may be, the electric current i of the motor increases until at time $t_2$ there is so much liquid in the washing compartment 2 that the circulation pump 23 can pump liquid essentially continuously. From time $t_2$ there is therefore once again a relatively constant power draw which is substantially greater than the no-load power of the electric drive 22. The electric current i of the electric motor is accordingly relatively constant from time $t_2$ and greater than the electric current i prior to time $t_1$.

In the time interval between $t_1$ and $t_2$ there is in fact liquid in the washing compartment 2. The amount of said liquid is not, however, sufficient for the circulation pump 23 to pump liquid essentially continuously. To put it more precisely, in the time interval between $t_1$ and $t_2$ the circulation pump 23 conveys a mixture of air and liquid, as a result of which the power draw of the electric drive 22, although increasing as the volume of liquid in the washing compartment 2 increases, also fluctuates relatively strongly. This in turn causes a relatively strongly fluctuating electric current i of the electric motor.

In the case of the present exemplary embodiment the control device 16 or, as the case may be, the computer program running on the control device 16 monitors the electric current i of the electric motor and compares this with a previously stored threshold value $i_S$ —step C of the flowchart. Said threshold value $i_S$ lies between the electric current i during no-load operation and the electric current i starting from time $t_2$ and in the case of the present exemplary embodiment is reached at time $t_3$.

If the control device 16 detects that the electric current i of the electric motor has reached the threshold value $i_S$, it automatically closes the filling valve 13, thereby stopping the feeding of liquid from the water supply line 14 into the storage container 8—step D of the flowchart. This means that a full storage container 8 can be detected in a relatively simple manner.

In the case of the described exemplary embodiment the electric current i of the electric motor of the electric drive 22 for the circulation pump 23 is monitored for the purpose of detecting a full storage container 8. Other operating parameters of the electric drive 22 or the circulation pump 23 are also suitable. Further suitable operating parameters are e.g. the torque of the electric motor or circulation pump 23, an electrical voltage of the electric drive 22, the root-mean-square value of the generated electrical voltage, for example, or a rotational speed of the electric motor.

The full storage container 8 can also be detected as a result of detecting a relatively large fluctuation in the operating parameter. As explained hereintofore, the electric current i fluctuates relatively strongly in the time interval between $t_1$ and $t_2$. Accordingly, a relatively large fluctuation in the operating parameter can also be used for detecting a full or, as the case may be, overflowing storage container 8.

In the case of the described exemplary embodiment the circulation pump 23 is driven by the electric drive 22, the motor of which is a brushless three-phase synchronous motor. Other electric drives for the circulation pump 23 are also possible. In particular it is not necessary for the electric drive 22 to be a three-phase current drive. Direct-current or alternating-current drives, for example, can also be used.

The invention claimed is:

1. A method for operating a water-conducting household appliance having a storage container, a washing compartment, an overflow outlet in liquid connection between the storage container and the washing compartment, and a pump in liquid connection with the washing compartment, the method comprising:
   starting the pump;
   filling the storage container with a liquid;
   monitoring an operating parameter associated with the pump after the pump has been started, the operating parameter being indicative of the pump pumping liquid that has overflowed from the storage container; and terminating the filling of the storage container with the liquid when the operating parameter reaches and/or exceeds at least one of a predefined threshold value and a predefined fluctuation range,
wherein the predetermined threshold value is set to minimize an amount of the liquid flowing from the storage container to the washing compartment by way of the overflow outlet.

2. The method of claim 1, wherein the water-conducting household appliance is one of a dishwasher and a washing machine.

3. The method of claim 1, wherein the operating parameter associated with the pump is a torque of the pump.

4. The method of claim 1, wherein the storage container is secured to an external wall of the water-conducting household appliance in a heat-conducting manner.

5. The method of claim 1, wherein the liquid is delivered by way of the pump to spraying devices disposed inside the washing compartment.

6. The method of claim 1, further comprising:
starting a drive that operates the pump; wherein
the operating parameter associated with the pump is an operating parameter of the drive.

7. The method of claim 6, wherein the drive is an electric motor.

8. The method of claim 7, wherein the electric motor is a brushless three-phase synchronous motor.

9. The method of claim 6, wherein the operating parameter is at least one of a first electric power output of the drive, an electric current of the drive, an electrical voltage of the drive, a torque generated by the drive, and a rotational speed of the drive.

10. The method of claim 6, wherein the operating parameter is one of:
the electric current of the drive, wherein the predefined threshold value is associated with an electric current intensity that is greater than an electric current intensity of the drive when the pump is essentially pumping only air and that is less than the electric current intensity of the drive when the pump is pumping the liquid essentially continuously; and
an electric power output of the drive, wherein the predefined threshold value is associated with a an electric power output value that is greater than the electric power output of the drive when the pump is essentially pumping only air and less than the electric power output of the drive when the pump is pumping the liquid essentially continuously.

11. The method of claim 1, further comprising pumping residual liquid out of the washing compartment before at least one of the storage container is filled with the liquid and the pump is started.

12. The method of claim 1, wherein the predetermined threshold and the predefined fluctuation range are set to prevent the pump from pumping a continuous supply of the liquid while the storage container is being filled.

13. The method of claim 12, wherein the threshold value and the predefined fluctuation range are indicative of the storage container being filled to capacity.

14. The method of claim 1, wherein the storage container and the washing compartment each comprises a side wall, the storage container side wall and the washing compartment side wall being in direct contact with one another.

15. A controller configured to carry out the method of claim 1.

16. A microprocessor programmed to carry out the method of claim 1.

17. A method for filling a storage container of a water-conducting household appliance, the water-conducting household appliance comprising a washing compartment and comprising a pump in fluid communication with the washing compartment, the washing compartment being separate from the storage container, the method comprising:
starting the pump;
filling the storage container with a liquid; monitoring an operating parameter associated with the pump after the pump has been started, the operating parameter being indicative of the pump pumping liquid that has overflowed from the storage container; and
terminating the filling of the storage container in response to the pump pumping liquid that has overflowed from the storage container to the washing compartment.

18. The method of claim 17, wherein the filling of the storage container is terminated when the operating parameter reaches and/or exceeds at least one of a predefined threshold value and a predefined fluctuation range.

19. The method of claim 18, wherein the predetermined threshold value is set to an operating parameter value that occurs when the pump is pumping both air and the liquid that has overflowed from the storage container.

20. The method of claim 19, wherein the predefined fluctuation range is set to an operating parameter value that occurs when the pump is pumping both air and the liquid that has overflowed from the storage container.

* * * * *